United States Patent
Hillebrecht et al.

(10) Patent No.: US 8,532,990 B2
(45) Date of Patent: Sep. 10, 2013

(54) SPEECH RECOGNITION OF A LIST ENTRY

(75) Inventors: Christian Hillebrecht, Blaustein (DE); Markus Schwarz, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 878 days.

(21) Appl. No.: 12/706,245

(22) Filed: Feb. 16, 2010

(65) Prior Publication Data

US 2010/0211390 A1 Aug. 19, 2010

(30) Foreign Application Priority Data

Feb. 19, 2009 (EP) ..................................... 09002356

(51) Int. Cl.
*G10L 15/00* (2013.01)

(52) U.S. Cl.
USPC ............................. 704/243; 704/251; 704/275

(58) Field of Classification Search
USPC ......................................... 704/243, 251, 275
See application file for complete search history.

(56) References Cited

U.S. PATENT DOCUMENTS

| | | | | |
|---|---|---|---|---|
| 5,202,952 | A | 4/1993 | Gillick et al. ...................... | 395/2 |
| 5,963,893 | A * | 10/1999 | Halstead et al. ................... | 704/9 |
| 6,065,003 | A | 5/2000 | Sedluk ............................... | 707/6 |
| 6,571,210 | B2 | 5/2003 | Hon et al. ......................... | 704/251 |
| 6,850,886 | B2 | 2/2005 | Abrego et al. ..................... | 704/240 |
| 6,985,861 | B2 | 1/2006 | Van Thong et al. ............... | 704/254 |
| 7,120,582 | B1 * | 10/2006 | Young et al. ....................... | 704/255 |
| 2001/0018654 | A1 | 8/2001 | Hon et al. .......................... | 704/257 |
| 2001/0049600 | A1 | 12/2001 | Abrego et al. ..................... | 704/240 |
| 2003/0110035 | A1 | 6/2003 | Thong et al. ....................... | 704/254 |
| 2003/0187643 | A1 * | 10/2003 | Van Thong et al. ............... | 704/254 |
| 2004/0260681 | A1 | 12/2004 | Dvorak ............................... | 707/3 |
| 2007/0136060 | A1 | 6/2007 | Hennecke et al. ................. | 704/251 |
| 2009/0210230 | A1 | 8/2009 | Schwarz ............................ | 704/252 |

FOREIGN PATENT DOCUMENTS

| | | |
|---|---|---|
| EP | 0 282 272 A1 | 9/1988 |
| EP | 0 651 372 A2 | 5/1995 |
| EP | 1 162 602 A1 | 12/2001 |
| EP | 1 734 509 A1 | 12/2006 |

(Continued)

OTHER PUBLICATIONS

European Patent Office—Extended European Search Report; Application No. 09002356.5-2225; Jul. 31, 2009.

(Continued)

*Primary Examiner* — Daniel D Abebe

(74) *Attorney, Agent, or Firm* — Sunstein Kann Murphy & Timbers LLP

(57) ABSTRACT

The present invention relates to a method of generating a candidate list from a list of entries in accordance with a string of subword units corresponding to a speech input in a speech recognition system, the list of entries including plural list entries each comprising at least one fragment having one or more subword units. For each list entry, the fragments of the list entry are compared with the string of subword units. A matching score for each of the compared fragments based on the comparison is determined. The matching score for a fragment is further based on a comparison of at least one other fragment of the same list entry with the string of subword units. A total score for each list entry is determined based on the matching scores for the compared fragments of the respective list entry. A candidate list with the best matching entries from the list of entries based on the total scores of the list entries is generated.

55 Claims, 9 Drawing Sheets

(56) References Cited

FOREIGN PATENT DOCUMENTS

EP 2 081 185 A1 7/2009
WO WO 2004/077405 A1 9/2004

OTHER PUBLICATIONS

Shafran, et al. "Use of Higher Level Linguistic Structure in Acoustic Modeling for Speech Recognition," *Department of Electrical Engineering*, University of Washington, Seattle, WA, 2000, pp. 1021-1024.

Neubert, F., et al. "Directory Name Retrieval Over the Telephone in the Picasso Project," *Proceedings IEEE Workshop on Interactive Voice Technology for Telecommunications Applications*, 1998, pp. 31-36.

\* cited by examiner

SPEECH RECOGNITION OF A LIST ENTRY

PRIORITY

The present U.S. Patent Application claims priority from European Patent Application No. 09 002 356.5 Filed on Feb. 19, 2009 entitled Speech Recognition of a List Entry which is incorporated herein by reference in its entirety.

TECHNICAL FIELD

The present invention relates to a method of selecting a list entry from a list of entries via speech input, and to a method of generating a candidate list from a list of entries in accordance with a string of subword units corresponding to a speech input. The invention further relates to a speech recognition system adapted to perform one of the methods.

BACKGROUND ART

A wide variety of electronic devices are being equipped with a speech recognition capability. Examples include a vehicle navigation system capable of receiving voice commands for e.g. selecting a destination, computer systems for recognizing spoken text, or mobile telephones capable of dialing the number of a contact in response to a corresponding voice command. Often, a large number of entries or elements are provided in the form of a list, and one of these entries is to be selected by the user with a voice command. Examples of such lists comprising plural list entries are a list of location names or points of interest (POIs), a list of businesses, a list of addresses, a list of song titles, and the like. Such lists can comprise millions of entries. However, electronic devices, such as portable electronic devices, are often equipped with only a limited vocabulary of a speech recognizer. This often due to the limited processing capabilities and memory resources available on such a portable electronic device. It is thus difficult to select an entry from such a large list by voice command.

A solution for this problem is provided by WO 2004/077405 A1. The solution uses a two-step approach. A voice input from a user is converted into a character sequence, and the character sequence is matched against the list of entries to generate a sub-list. A matching step generally requires less processing power compared to a speech recognition step. A new vocabulary is then generated based on the sub-list, and the speech input is recognized using the new vocabulary. Although this method facilitates the handling of large lists of entries, it does not provide any concept for handling longer list entries. As an example, a list entry for a business may comprise both the name of the business and its address, i.e. street name and city. The list entry may thus comprise a plurality of words, such as "Autovermietung Euromobil Autohaus Starvenov GmbH Betrieb Nordstadt Bornhardtstraße". If the user would like to enter the business as a destination in e.g. a navigation system, the user may only speak some of the words of the entry, such as "Autovermietung Euromobil", or may speak words of the entry in another order, such as "Euromobil Autovermietung". A conventional speech recognition system will either not be capable of recognizing the corresponding entry when receiving such a speech input, or it will have a high probability of recognizing a false entry. Accordingly, the recognition of partially and/or permutedly spoken list entries is a problem in conventional speech recognition systems.

A possibility of recognizing partially spoken entries would be "Rolled out" recognition, in which all possible speakable alternatives or combinations are formed of the words of each list entry, and recognition is then performed on these alternatives. Yet even for short lists of only 10,000 entries there are as many as $10^{10}$ alternatives for list entries of the above-mentioned type. Performing of a speech recognition on a list of such a size is generally not possible with systems available today, in particular with hand-held systems, such as a personal navigation device, a personal digital assistant or a mobile telephone. Even lists with $10^7$ entries can generally not be processed.

Accordingly, there is a need to enable the selection of a list entry by speech input even if the list entry is only partially or permutedly spoken. Further, there is a need of improving a recognition rate for partially or permutedly spoken list entries. It is desirable to enable a user to select a list entry from a large list of entries by voice input by only speaking a part of the list entry.

SUMMARY OF THE INVENTION

According to a first aspect of the invention a method of generating a candidate list from a list of entries in accordance with a string of subword units corresponding to a speech input in a speech recognition system is provided. The list of entries includes plural list entries each comprising at least one fragment having one or more subword units. The method comprises the steps of comparing fragments of a list entry for each list entry with the string of subword units, determining a matching score for each of the compared fragments based on the comparison, wherein the matching score for a fragment is further based on a comparison of at least one other fragment of the same list entry with the string of subword units, determining a total score for each list entry on the basis of the matching scores for the compared fragments of the respective list entry and generating the candidate list with the best matching entries from the list of entries based on the total scores for the list entries.

Such a method may be automatically performed by a speech recognition system. As a matching score may be determined for each fragment of a list entry, a candidate list comprising the best matching entries may be generated even if the speech input comprises only part of a list entry (e.g. if a user operating the speech recognition system speaks only part of the list entry). The generation of a candidate list on which speech recognition may be performed enables the selection of a list entry even from a very large list of entries. As a total score for a list entry, the best of the matching scores of the fragments of the list entry may be used. Considering matching scores of other fragments of the same list entry when matching a fragment of the list entry has the advantage that combinations of the fragments can effectively be compared to the string of subword units, so that the best matching score for a list entry may represent a matching score for the best matching combination of fragments of the list entry. Note that the subword units of the string and the subword units of the list entries may be of a different type.

According to an embodiment of the invention, the matching score for a fragment of a list entry is determined such that the matching score corresponds to a matching score for matching a combination of the fragment with at least one other fragment of the same list entry against the string of subword units. The determination of the total score for a list entry may for example be based on the matching score corresponding to a matching score for a combination of fragments of the list entry, wherein the determination may further be configured so as to consider a language model comprising at least transition probabilities between the fragments of the combination. As an example, a bigram language model may be used, wherein probabilities for an occurrence of a sequence of fragments may be defined, and wherein a penalty for self-transition between the same words may be applied. The matching score may effectively indicate how well the combination of fragments matches the string of subword units.

The determination of the matching score for the fragment may be further performed so as to allow any combination of fragments of a list entry. Accordingly, even if the speech input comprises the same fragment twice or comprises fragments of a list entry in reverse order, a matching score may accurately be determined for the list entry. A candidate list with list entries having a high probability of matching the string of subword units may even in these cases be generated.

According to another embodiment, the comparing may be performed by matching each fragment of a list entry separately against the string of subword units. The matching score for a fragment may for example be determined by consecutively matching the fragment against each subword unit of the string of subword units. Required processing power and processing time may thus only depend linearly on the number of fragments of the list entries and the number of subword units comprised in the string of subword units. A fast matching and a fast generation of the candidate list may thus be achieved.

The comparing of a fragment with the string of subword units may be performed by matching the fragment against the string of subword units using a Levenshtein algorithm.

The Levenshtein algorithm may be a modified Levenshtein algorithm. The comparison of a fragment of a list entry with the string of subword units may comprise the steps of determining cost values for the fragment by matching the fragment against a first subword unit of the string of subword units; and, of the cost values determined for the fragment for the first subword unit, substituting an initial cost value by the smallest of all cost values occurring during the matching of all fragments of the list entry separately against the first subword unit. The determining of cost values and the substitution of an initial cost value of the determined cost values may then be repeated for the remaining subword units of the string of subword units. The matching of the fragment against a subword unit may thereby consider at least one substituted initial cost value. This may e.g. be the substituted initial cost value of the precedingly matched subword unit, or the substituted initial cost value for any other subword unit, which may, e.g. indirectly, be considered. Thereby, a final cost value is obtained for the compared fragment. During the matching of a fragment the best cost value may thus be inserted for each subword unit of the string of subword units, as a result of which the matching corresponds to a matching of a combination of the fragment with one or more of the best matching fragments of the list entry against the string. Effectively, the matching of any order or combination of fragments of the list entry may thus be achieved.

The Levenshtein algorithm may be a weighted Levenshtein algorithm, wherein a cost value of an edit operation may be weighted in accordance with a similarity of subword units of the fragment and the string of subword units compared in the operation. As an example, if the same speech input is spoken by different users, different strings of subword units may be generated from the speech input. Similarity considerations may thus improve the quality of a generated candidate list.

The Levenshtein algorithm may be a context-sensitive Levenshtein algorithm, wherein a cost value for an added operation in which a subword unit of a fragment is compared to a subword unit of the string of subword units may be determined taking into account the subword unit before and/or after the currently compared subword unit in the fragment and/or in the string of subword units. The matching accuracy may thus be further improved.

Further, a combination of the fragments of a list entry which best matches the string of subword units may be determined by analyzing intermediate scores determined by comparing the fragments of the list entry with a part of the string of subword units. Such intermediate scores may for example be the cost values during a Levenshtein matching. From the intermediate scores it may thus be backtracked which combination of the fragments of the list entry is a best match for the string of subword units. Such information may improve the performance of a later speech recognition step.

A pruning may be applied during the matching of a fragment against the string of subword units, for example if an intermediate score during the matching exceeds a threshold value or if the change of the intermediate score with subsequent matching steps exceeds a threshold value. A full Levenshtein matrix may thus not have to be calculated for fragments which are not expected to be comprised in the best matching combination of fragments of a list entry. A pruning may further be applied to the entire list entry if the matching scores indicate during their calculation that the list entry will not achieve a total score high enough to be included in the candidate list. A total score may thus not be determined for such a list entry.

The total score for a list entry may be normalized in accordance with a number of fragments of the list entry. A further normalization of a total score may be performed with a number of fragments comprised in the best matching combination of fragments. It may thus be ensured that the total scores for list entries with different numbers of fragments can be compared for generating the candidate list. The normalization may be realized by implementing a word transition penalty in the matching method, e.g. by penalizing the above-mentioned substitution of an initial cost value with the cost value obtained by matching another fragment of the list entry.

The method may further comprise receiving a speech input and generating a string of subword units from the speech input, as well as performing a speech recognition step on the speech input using the candidate list as a vocabulary. An entry may then be selected from the list of entries in accordance with a result of the speech recognition step.

According to a second aspect of the invention a method of generating a candidate list from a list of entries in accordance with a string of subword units corresponding to a speech input in a speech recognition system is provided. The list of entries includes plural list entries each comprising at least one fragment having one or more subword units. The method comprises the steps of comparing fragments of the list entries to the string of subword units, determining a matching score for each fragment on the basis of the comparison, the matching score indicating how well the fragment matches the string of subword units, determining a total score for each list entry based on the matching scores of the fragments of the respective list entry and generating the candidate list with the best matching entries from the list of entries based on the total scores for the list entries.

As each fragment may be separately compared to the string of subword units, the comparison can be performed fast and efficiently. The recognition of any combination of fragments of a list entry in the speech input may further be enabled. As the comparing may be performed by a Levenshtein algorithm and only single fragments may be matched, the method can even be applied to very large lists of entries.

According to an embodiment, the comparing may be performed for different context variants of a fragment, wherein the matching score for a context variant of the fragment may consider how well the context of the fragment corresponds to the context of the corresponding segment in the string of subword units. The determination of the total score may consider the matching scores for the context variants of the fragments. The total score for a list entry may then more accurately reflect the correspondence between the list entry and the string of subword units.

The context variant of a fragment may be accompanied by at least one wildcard, wherein the wildcard may represent the part of the string of subword units not considered in the fragment. A matching score for the context variant may be determined by matching the context variant including the wildcard against the string of subword units, wherein the matching may be configured such that the wildcard matches substantially uniformly against the subword units of the string. A fast and accurate determination of matching scores for the context variants of a fragment may thus be achieved.

For each list entry an intermediate score may be determined for each of different combinations of fragments of the entry, wherein the total score for the entry may be determined from the intermediate scores. A determination of an intermediate score for a combination of fragments may consider context variants of the fragments, in particular the matching score for the context variant of the fragment corresponding to the context of the fragment in the combination. The intermediate scores may be calculated for combinations of the fragments which have a matching score above a predetermined threshold value. A fragment with a matching score below the threshold value may thus not be used for forming a combination. The intermediate score for a combination may be normalized by the number of possible permutations of a number of fragments of the list entry corresponding to the number of fragments in the respective combination. As an example, for a combination of two fragments of a list entry comprising three fragments, there are six possible combinations of two fragments of the list entry, and an intermediate score may thus be normalized by ⅙. The factor may first be transformed into a score before being used for normalization, or it may be multiplied with intermediate scores if these are provided as probabilities.

The total score for a list entry may be determined on the basis of a mean or a sum of all intermediate scores determined for the list entry, or by simply taking the highest intermediate score as the total score of the list entry. Other ways of determining the total score for a list entry are also conceivable. Note that the intermediate scores may be provided as probabilities or likelihood scores, wherein a summation is preferable for obtaining the total score. Scores may also be provided as the negative logarithm of a probability. In that case, taking the best of the intermediate scores as the total score is preferred.

For the determination of the intermediate score for a combination of fragments the matching score of a context variant of the fragments may be used which corresponds to the context of the fragments in the combination. A more precise matching score may thus be determined for a combination of fragments.

An intermediate score for a combination of fragments may be penalized if the combination has at least one of the following properties: the combination overcovers the string of subword units; fragments of the combination cover the same part of the string of subword units; the combination does not cover all parts of the string of subword units. More accurate intermediate scores as well as more accurate resulting total scores may thus be determined for a list entry, which may improve the quality of the generated candidate list.

For predetermined fragments of the list entries, the comparing may be performed using a speech recognizer, wherein for the remaining fragments of the list entries the comparing may be performed using a matcher. For more important fragments, e.g. for fragments corresponding to often spoken commands, a more precise speech recognizer may thus be used for determining the matching scores. Such a recognizer may for example be Hidden Markov Model (HMM) based.

The candidate list generated according to the second aspect of the invention may be further provided as a second list of entries, and a second candidate list may be generated from the second list of entries using the method according to the first aspect of the invention, or an embodiment thereof. The candidate list generated according to the second aspect of the invention may thus be further shortened by applying the method according to the first aspect of the invention. It should be clear that it is also possible to first generate a candidate list from a list of entries according to the first aspect of the invention and to then provide the so generated candidate list as a list of entries for generating a second shorter candidate list according to the second aspect of the invention.

In both methods, i.e. the methods according to the first and the second aspect of the invention, an a priori probability may be assigned statically or dynamically to at least one of a fragment of a list entry, a combination of fragments of a list entry and a list entry. The a priori probability may then be taken into account when determining the total score for the list entry. List entries, such as commands or certain place names may have a higher probability of occurring in a speech input, and corresponding a priori probabilities may be assigned to the corresponding list entries. The a priori probabilities may be determined on the basis of at least one of a current position information, a language model, a frequency of use, a usage probability, a probability for a combination of fragments, and a probability for an ordering of fragments. The a priori probabilities may be part of a language model which may comprise predetermined probabilities for a list entry or for the occurrence of a sequence of fragments of a list entry.

The candidate list may be generated by including a predetermined number of list entries from the list of entries having the highest total score in the candidate list or by including list entries from the list of entries having a total score above a predetermined threshold value in the candidate list. The total score for a list entry may be normalized in accordance with a number of fragments in the list entry.

The candidate list generated according to the first or the second aspect of the invention, or a combination thereof, may be enrolled as a vocabulary in a speech recognizer, and a speech recognition step may be performed on the speech input using the vocabulary.

According to a third aspect of the invention a method of selecting a list entry from a list of entries via speech input is provided. The list of entries includes plural list entries each comprising at least one fragment, the method comprising the steps of receiving a speech input, generating a string of subword units from the speech input; generating a candidate list comprising entries from the list of entries which are a best match for the string of subword units; and performing a speech recognition step on the speech input using the candidate list as a vocabulary, wherein for an entry of the candidate list a probability for the entry matching the speech input is obtained. The speech recognition step is configured so as to enable the recognition of any combination of fragments of a list entry for each list entry of the candidate list.

Such a recognition may be considered an "open-loop" recognition, as a fragment of a list entry may follow each other fragment of the same list entry. This can facilitate the recognition step, as predetermined explicit sequences of fragments do not need to be considered. The recognition can thus be performed faster and requires less processing power. Further, meaningful recognition results are obtained even if the speech input only comprises part of a list entry, i.e. fewer fragments than comprised in the list entry.

According to an embodiment, the candidate list is generated from the list of entries according to the first or the second aspect of the invention, or a combination thereof.

The speech recognition step may be performed by a speech recognizer, wherein the fragments of the list entries of the candidate list may be enrolled as vocabulary in the speech recognizer. The enrolment may be performed so as to consider the grouping of the fragments in the list entries of the candidate list and so as to enable the recognition of any combination of fragments within one list entry. The speech recognition step may be based on Hidden Markov Models (HMMs), which may be assigned to fragments or to the subword units of fragments of the list entries of the candidate list.

As an example, the candidate list may be enrolled as a vocabulary for performing the speech recognition by assigning a state sequence to each fragment of the candidate list and, for each candidate list entry, by connecting the final state of the state sequence of each fragment of the list entry to the initial states of the state sequences of the other fragments of the same list entry. Thus, any combination of the fragments of the list entry may be recognized when performing the speech recognition step.

A language model may further be considered for determining transition probabilities between connected state sequences. The language model may for example at least consider probabilities for an occurrence of predetermined sequences of fragments in a spoken input. If a list entry may for example comprise "Autohaus Meier GmbH", it may be more likely that the speech input comprises "Autohaus Meier" than "Meier GmbH".

Further, a list of the best matching combinations of fragments may be generated, the list comprising the combinations of fragments having the highest probability of matching the speech input in the speech recognition step. The list of the best matching combinations may then be provided for selection to a user. After selection of the combination, the user may then be provided with the corresponding list entry. The selection process may thus be facilitated for the user, as the user may be provided with the part of the list entry that he has actually spoken.

According to another embodiment, a shortened candidate list may be generated from the list of entries or from the candidate list by determining all possible permutations of predetermined fragments of a list entry for predetermined list entries of the list of entries or of the candidate list; matching each determined permutation of the predetermined fragments against the string of subword units to obtain a matching score for each permutation; determining a total score for each predetermined list entry on the basis of the matching scores for the permutations determined for the list entry and generating the shortened candidate list of best matching entries from the predetermined list entries based on the total scores for the list entries. Entries from the shortened candidate list may then be provided for being used in the vocabulary for the speech recognition step. The shortened candidate list may be directly generated from the list of entries parallel to the generation of the candidate list according to the first and/or second aspect of the invention, or it may be generated from such a candidate list.

The predetermined list entries, for which the permutations are determined, may for example be the list entries from the list of entries or the candidate list having a number of fragments smaller than a predetermined threshold value. As the explicit generation of permutations of the fragments is processing power intensive, it is advantageous to create the shortened candidate list only from short list entries having a limited number of fragments.

On the other hand, the candidate list may be generated according to the second aspect of the invention, and the predetermined list entries for which the permutations are determined may be the list entries of the list of entries which are a best match for the string of subword units and which are not comprised in the candidate list. So list entries having high total scores from the list of entries which are not in the candidate list may still be included in the shortened candidate list. These list entries may have a relatively large number of fragments. Accordingly, the permutations for each predetermined list entry may be determined by selecting the fragments of the list entry having a matching score above a predetermined threshold value and determining all possible permutations of the selected fragments. As only permutations of the selected fragments may be matched, the required processing power and processing time can be reduced. The matching of explicit combinations of fragments may further improve the accuracy of determining matching scores.

According to a further embodiment, the candidate list may be generated according to the second aspect of the invention and a second shortened candidate list may be generated from the candidate list according to the first aspect of the invention. The list entries which are used as a vocabulary in the speech recognition step may then be selected from the shortened candidate list and the second shortened candidate list according to their respective total score. As an example, short list entries may be processed by matching of explicit combinations of fragments, whereas other list entries may be processed according to one or a combination of the first and the second aspect of the invention.

For obtaining the matching score for the permutations, a language model may further be used. In accordance with the language model, a penalty may be applied to the matching score for predetermined permutations of fragments, or a probability for an occurrence of predetermined sequences of fragments in a spoken input may be considered.

According to a further embodiment, the method may comprise a second speech recognition step on the speech input. The second speech recognition step may use a predetermined number of best matching entries from the result of the first speech recognition step as a vocabulary. The results from the first speech recognition step may thus be further refined.

According to another embodiment, the method further comprises a second speech recognition step on the speech input, wherein the second speech recognition step may be performed parallel to the first speech recognition step and may use the shortened candidate list generated as described above as a vocabulary. The second speech recognition step may thus be performed on the results of a matching of explicit combinations of fragments (or "rolled-out" matching), e.g. for short list entries of the list of entries.

The second speech recognition step may be a conventional speech recognition step which recognizes variants of list entries. As an example, the list entries to be used in the second speech recognition step may be enrolled as a vocabulary, wherein the enrolling may comprise the forming of explicit combinations of fragments of a list entry for each of the list entries and the assigning of a chain of state sequences to each explicit combination of fragments.

According to another aspect of the invention, a speech recognition system for selecting a list entry from a list of entries via speech input is provided, wherein the list of entries includes plural list entries each comprising at least one fragment. The system comprises a database adapted to provide the list of entries, a recording unit for recording a speech input, a subword unit recognition unit adapted to generate a string of subword units from the speech input, and a candidate list generation unit adapted to generate a candidate list comprising entries from the list of entries which are a best match for the string of subword units. The system further comprises a speech recognition unit adapted to perform a speech recognition step on the speech input using the candidate list as a vocabulary, wherein for an entry of the candidate list a probability for the entry matching the speech input is obtained. The speech recognition unit is further configured so as to enable the recognition of any combination of fragments of a list entry for each list entry of the candidate list. Such a speech recognition system may achieve similar advantages as outlined above.

The candidate list generation unit may be adapted to generate the candidate list from the list of entries according to the first and/or the second aspect of the invention.

The speech recognition system may further be adapted to perform a method according to the third aspect of the invention.

According to another aspect of the invention, a computer program product that can be loaded into the internal memory of a computing device is provided. The product comprises software code portions for performing one of the above-mentioned methods when the product is executed. Further, an electronically readable data carrier is provided with stored electronically readable control information configured such that when using the data carrier in a computing device the control information performs one of the above-mentioned methods.

The terms used above are to be understood in their broadest meanings Subword units may for example be parts of phonemes, whole phonemes, letters, syllables, and the like. A fragment may comprise one or more subword units. A fragment may for example be a syllable, a part of a word, a whole word, or a combination of words. The string of subword units may thus comprise a sequence of subword units, e.g. a sequence of phonemes.

It is to be understood that the features mentioned above and those yet to be explained below can be used not only in the respective combinations indicated, but also in other combinations or in isolation, without leaving the scope of the present invention.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
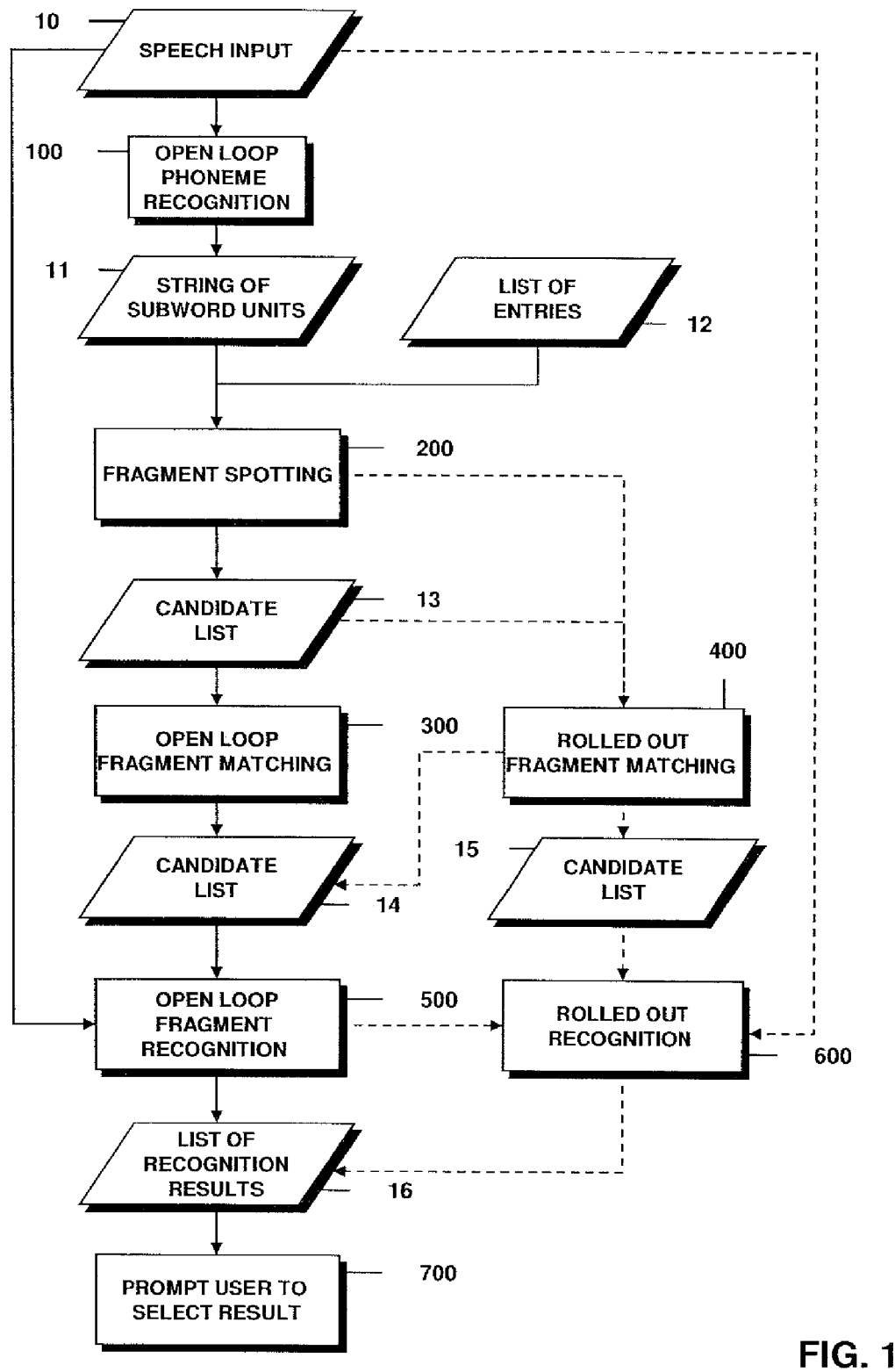
FIG. 1 is a schematic flow diagram illustrating an embodiment of a method of selecting a list entry from a list of entries via speech input, the method comprising steps according to different aspects of the invention.

An aim of the present invention is to enable the recognition of an only partially spoken list entry from a large list of entries while keeping the processing power and memory required for the speech recognition to a minimum. According to the embodiment of the method illustrated in FIG. 1, this is achieved by first reducing the size of the list of elements to create a shorter candidate list, and then performing the speech recognition on the shortened list, and by implementing simplified methods for generating the candidate list and performing the speech recognition which is adapted to enable the recognition of only a partially spoken list entry. FIG. 1 gives an overview of an embodiment of the invention, in which a speech input 10 is received, e.g. from a recording unit comprising a microphone and an analog-to-digital converter. In a first step 100, an open-loop type phoneme recognition is performed on the speech input. It should be clear that subword units other than phonemes may be recognized in step 100. Step 100 recognizes subword units in the speech input using a first vocabulary which may comprise e.g. a certain number of phonemes. The recognition is open-loop as any combination of phonemes may be recognized in step 100. A string of subword units 11 is obtained in step 100 which includes a sequence of consecutive phonemes or other subword units. Step 100 may also generate several alternative sequences of subword units which may include similar or easily confusable subword units. Such a phoneme recognition is described in more detail in the international patent publication No. WO 2004/077405 A1, which is incorporated herein by reference in its entirety.

Speech input 10 corresponds to an utterance of a user by which the user may want to select a list entry from the list of entries 12. The list of entries 12 may comprise any type of information, such as location names, points of interest, names, addresses and telephone numbers, artist and song titles, and the like. It may further comprise commands with which a user may operate e.g. a navigation system, a multimedia system, a mobile phone, a personal digital assistant, or any type of electronic device which may include a speech recognition system for receiving voice commands. List of entries 12 may be provided on an internal memory of such a device, or on any other type of data carrier, such as a memory card, a CD ROM, a DVD or the like. Each list entry may comprise one or more fragments, which may be words or parts of words, or even smaller units, such as syllables, or a combination of words. As an example, the list entry "Autovermietung Topcar Ulm Eichensteige Helmut Zeller GmbH" may comprise the fragments "Autovermietung", "Topcar", "Ulm", "Eichensteige", "Helmut", "Zeller", and "GmbH", wherein the fragments themselves may for example have different speakable alternatives. A user may for example only say "GmbH" for "Gesellschaft mit beschränkter Haftung".

In a second step 200 (fragment spotting) fragments of the entries of the list of entries 12 are compared to the string of subword units 11. This may be done using a recognizer, e.g. HMM-based, and/or by a matcher, e.g. Levenshtein-based. Based on the matching scores for the fragments a total score is determined for each list entry. The list entries having the highest total scores are included in the candidate list 13. The list of entries 12 may for example comprise one million or more entries, which may be reduced to 10000 entries in the candidate list 13.

A third step 300 performs an open-loop fragment matching of the fragments of each entry of the candidate list 13 against the string of subword units 11. The utterance which a user may speak is approximated by a loop recognition over the set of fragments of each list entry. Again, a total score is obtained for each entry of the candidate list 13 which may e.g. correspond to the matching score of the best matching combination of fragments of each list entry. The list entries having the highest total score are again included in a second candidate list 14, which e.g. comprises 1000 of the best matching entries.

It is also possible to perform only one of the steps 200 and 300 for generating the candidate list. It is also possible to perform steps 200 and 300 in reverse order.

A fourth step 400 comprising a rolled-out fragment matching may be performed parallel to steps 200 and 300, e.g. on list entries of the list of entries 12 having a small number of fragments, e.g. fewer than four, three or two fragments. Results from the rolled-out fragment matching 400 may be included in candidate list 14 in accordance with the total scores for the list entries, or another candidate list 15 may be generated from the entries with the highest total matching scores. Step 400 may also be performed after step 200 for predetermined entries of candidate list 13, or after step 300 for predetermined entries of candidate list 14.

In another embodiment, n list entries from the list of entries 12 having the highest total score in step 200 may be included in candidate list 13 and further processed by step 300 (n-best list). For list entries which are in a m-best list in step 200, with m>n, yet which are not in the n-best list, step 400 may be performed. Results of step 400 may be combined with candidate list 14 or may be used to generate candidate list 15.

In a fifth step 500 an open-loop fragment recognition is performed on candidate list 14. The speech recognition step 500 is performed on the original speech input 10 using the candidate list 14 as a vocabulary. "Open-loop" means that the recognition is not constrained to particular explicit variants of list entries, which is a simplification over conventional methods and enables the recognition of only partially spoken list entries. A list of recognition results 16 is obtained, parts of which may be provided to a user for selection in step 700.

The results of the speech recognition step 500 may be further refined by performing a rolled-out speech recognition step 600 on the results of step 500. Step 600 may also be performed parallel to step 500, e.g. on the results of the rolled-out matching step 400, i.e. the candidate list 15. The results from steps 500 and 600 may be combined by sorting the list entries according to their probabilities or scores.

Steps 200 and 300 are capable of matching only partially spoken list entries and do not have high demands on processing power. Similarly, step 500 can recognize partially spoken list entries and, as it uses the shortened candidate list 14, can be performed with relatively low processing power and memory requirements. A fast and reliable recognition of speech input 10 can thus be ensured even on devices having limited hardware capabilities. A further improvement in recognition rate can be achieved by performing the additional steps 400 and 600, e.g. on short list entries.

It should be clear that not all possible combinations of steps 200-600 are indicated by solid or dashed lines in FIG. 1, and that other combinations are also conceivable, depending on the application.

In the following, embodiments of steps 200 to 600 will be described in more detail.

Figure 2:
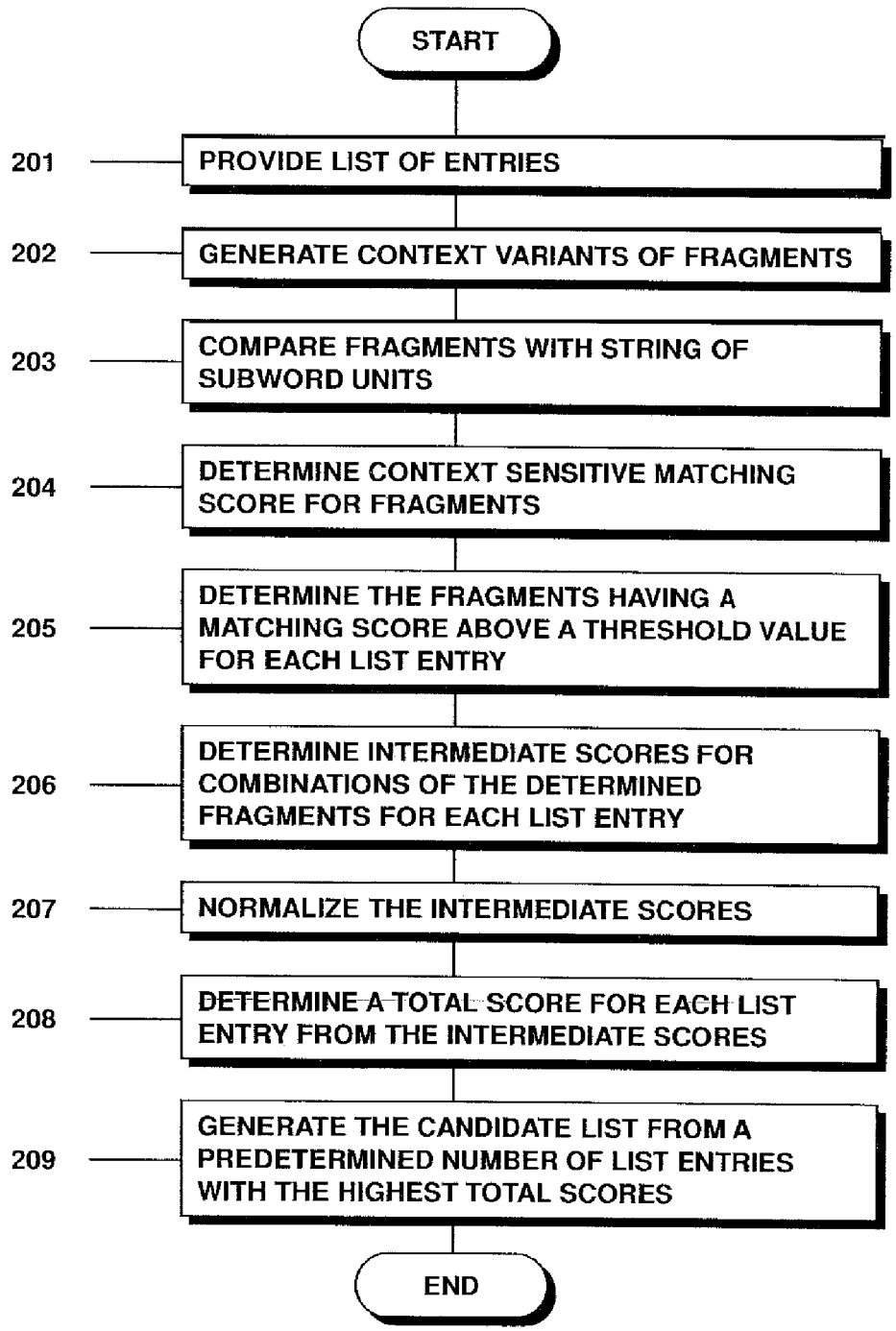
FIG. 2 is a schematic flow diagram of an embodiment of a method according to the second aspect of the invention, which may be performed at step 200 of FIG. 1.
Figure 7:
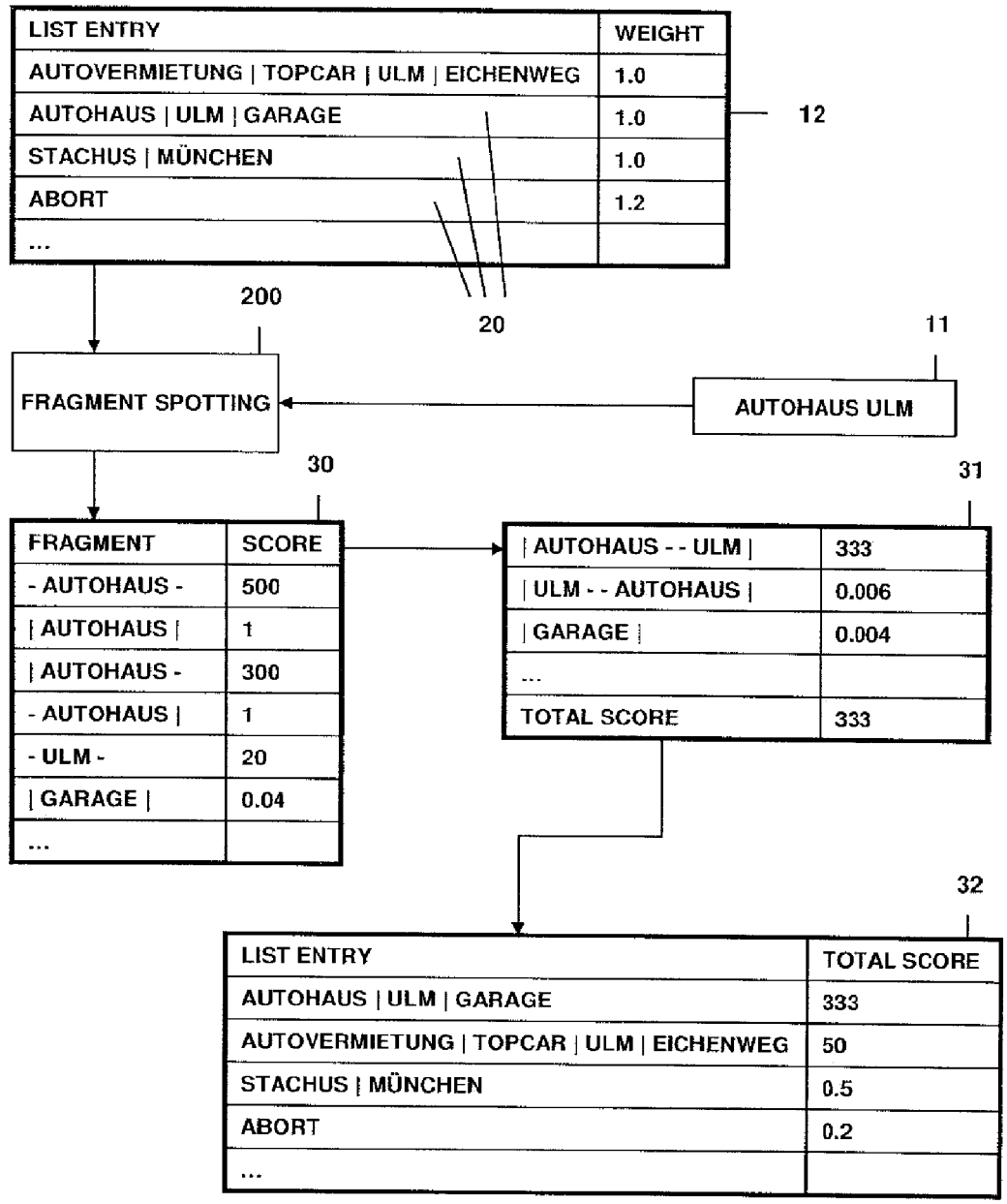
FIG. 7 is a schematic block diagram illustrating the scoring of fragments and of list entries according to the method of FIG. 2 in more detail.

FIG. 2 illustrates an embodiment of the second aspect of the invention and describes step 200 of FIG. 1 in more detail. In step 201, a list of entries is provided, each entry comprising one or more fragments as illustrated in FIG. 7. The list entries 20 of the present example comprise both commands like "abort" and location names. In step 202, context variants of the fragments are generated. A context variant of a fragment is the fragment including its position in the utterance: the fragment may be located at the beginning of the utterance, the end of the utterance, the middle of the utterance or the utterance may consist only of the fragment. It is also possible to use a finer scheme. Table 30 shows four context variants of the fragment "Autohaus", wherein "|" denotes the end of the utterance at the respective site.

In step 203 the context variants of the fragments are compared with the string of subword units 11. In the present example the context variant "|Autohaus-", which indicates that "Autohaus" is to be located at the beginning of the utterance, gives a relatively high score when compared to the string 11 "Autohaus Ulm", whereas the context variant "-Autohaus|" gives a relatively low score. The scores for the context variants of the fragments can for example be calculated by performing a matching using a wildcard scheme, wherein the wildcard represents the part of the list entry not considered in the fragment. The matching may then be configured so that the wildcard matches substantially uniformly against the string of subword units 11. Such a wildcard scheme is described in more detail in the patent application EP 0 800 772.7, which is incorporated herein by reference in its entirety.

If the number of different fragments of a list entry is very high, it may be advantageous to improve the performance by not matching the four context variants of all fragments, but by only matching predetermined context variants. A further improvement in performance may be achieved by performing the fragmentation at a lower level, a fragment may for example correspond only to a part of a word. Matching may be performed by using a Levenshtein algorithm. Important words, such as most frequently used words or commands, may be compared with the string of subword units with a more precise recognizer instead of a matcher. Although a recognizer is more precise, a matcher is generally faster. After scoring the context variants of the fragments, the scores can be normalized to allow for an addition of scores. After calculation of the normalized scores for the context variants, a total score can be calculated for each list entry. This can occur in dependence on a language model.

The context-sensitive matching scores for the fragments of the list of entries 12 are shown in table 30 in FIG. 7. For determining a total score for each list entry intermediate scores for combinations of fragments of the list entry are first determined. Therefore, the fragments having a matching score above a threshold value are first determined for each list entry (step 205). For combinations of these fragments of a list entry intermediate scores are determined in step 206. Using only fragments with a matching score above the threshold value for forming the combinations has the advantage that fragments with low matching scores do not need to be considered, and intermediate scores need to be calculated for fewer combinations.

In the example of FIG. 7 table 30 shows matching scores for the context variants of the fragments of the list entry "Autohaus Ulm Garage". The scores for "Autohaus" are shown in the table, whereas the scores for "Ulm" for the corresponding context variants may be: 20/0.1/0.1/20, and for "Garage": 0.02/0.04/0.04/0.04. Combinations may then for example only be formed of the highest scoring context variants of the fragments "Autohaus" and "Ulm". The scores for these combinations are shown in table 31. The scores may for example be calculated as probability like numbers, which can be multiplied for giving the score for a combination of fragments. The intermediate scores shown in table 31 have been further normalized in step 307. The normalization generally occurs such that the scores for different list entries can be compared to each other so that a meaningful candidate list can be generated. For normalization a language model may be used which for example defines that "all list entries are equally probable" and that "inside a list entry all spoken fragment counts are equally probable". If available, a more refined language model can be used.

According to a language model, a priori probabilities may further be assigned to list entries. It may for example be considered more likely that a user speaks "Autohaus Ulm" instead of "Ulm Autohaus". This may for example be modeled with a bigram model, which gives the first combination a higher a priori probability. In another example it may be more probable that the user speaks "Autohaus Ulm" than "Ulm Garage". This could be considered by the language model by assigning weights to subsets of fragments of a list entry. Further, there may be a semi-allowance for a user speaking a filler word like "in", which may be modeled with a unigram. As another example, there may be a higher probability of a user speaking a command like "abort" than a regular list entry, which may be considered by the language model by weighting the entire list entry with a higher weight, as illustrated in the list of entries 12 in FIG. 7.

Such a priori probabilities of a language model may be considered when determining the intermediate scores of the combinations or a total score for a list entry. The collection of the effective a priori probabilities (the sum over the speakable variants of the list entry) should usually be equal to the a priori probability for the list entry determined by the language model. For the list entry considered in FIG. 7 and for the above-mentioned language model, a user may speak one, two or three words for selecting the list entry under consideration. The intermediate scores may thus be normalized by ⅓. When considering a combination of two fragments, such as "|Autohaus—Ulm|", there are six possible combinations of two fragments for the corresponding list entry "Autohaus Ulm Garage". The intermediate score is thus further normalized by ⅙. For the formerly mentioned combination an intermediate score can then be calculated to ⅓×⅙×300×20=333 (see further above for the score of −Ulm|). For the combination "|Garage|", there are only three possible combinations of one fragment, and the corresponding intermediate score can thus be calculated to ⅓×⅓×0.04=0.004.

For determining a total score for each list entry from the intermediate scores in step 208, the intermediate scores or probabilities of the speakable combinations of the list entry, e.g. "Autohaus", "Ulm", "Garage", "Autohaus Ulm", "Autohaus Garage", . . . , can be added together to give the total score for the list entry, or the highest intermediate score can be used as the total score for the list entry. Table 32 in FIG. 7 shows the total score for the list entries of the list of entries 12 determined according to the later method. In step 209 a candidate list is generated from a predetermined number of list entries with the highest total scores. Alternatively, the entries with a total score above a threshold value may be included in the candidate list. In the example of FIG. 7 the first two list entries may for example be included in the candidate list. It should be clear that the example is only of an illustrative nature, and that the candidate list may comprise thousands or tens of thousands of list entries.

Additionally or instead of scoring context variants of fragments, position-based scoring with a higher resolution (not just beginning/end/middle/whole) and/or overlap/underlap considerations may be used in step 200. A penalty may for example be applied to intermediate scores for a speakable combination which does not cover all parts of the string of subword units. This may be achieved by employing a position-based scoring of the fragments. A penalty may be applied to intermediate scores for speakable combinations which overcover the utterance, i.e. in which the best spots for more than one fragment in the combination overlap. This may similarly be achieved by a position-based scoring of the fragments. As an example, for a list entry "Ulm Autohaus Lautohau GmbH", a user may speak "Ulm Autohaus GmbH". Without an overlap consideration, the combination of fragments "Ulm Autohaus Lautohau GmbH" may score better than "Ulm Autohaus GmbH". An overlap consideration may catch that "Autohaus" and "Lautohau" use the same spot in the utterance, i.e. the string of subword units. Further, the scoring may be adjusted by considering phonetic similarities between fragments and/or fragment parts. In the above-mentioned example, combinations comprising both "Autohaus" and "Lautohau" may get a score penalty, i.e. the score may be reduced by a predetermined value or a predetermined factor.

The above description of the language model and the normalization of the intermediate or total scores also applies to the remaining steps which will be described in more detail in the following.

Figure 3:
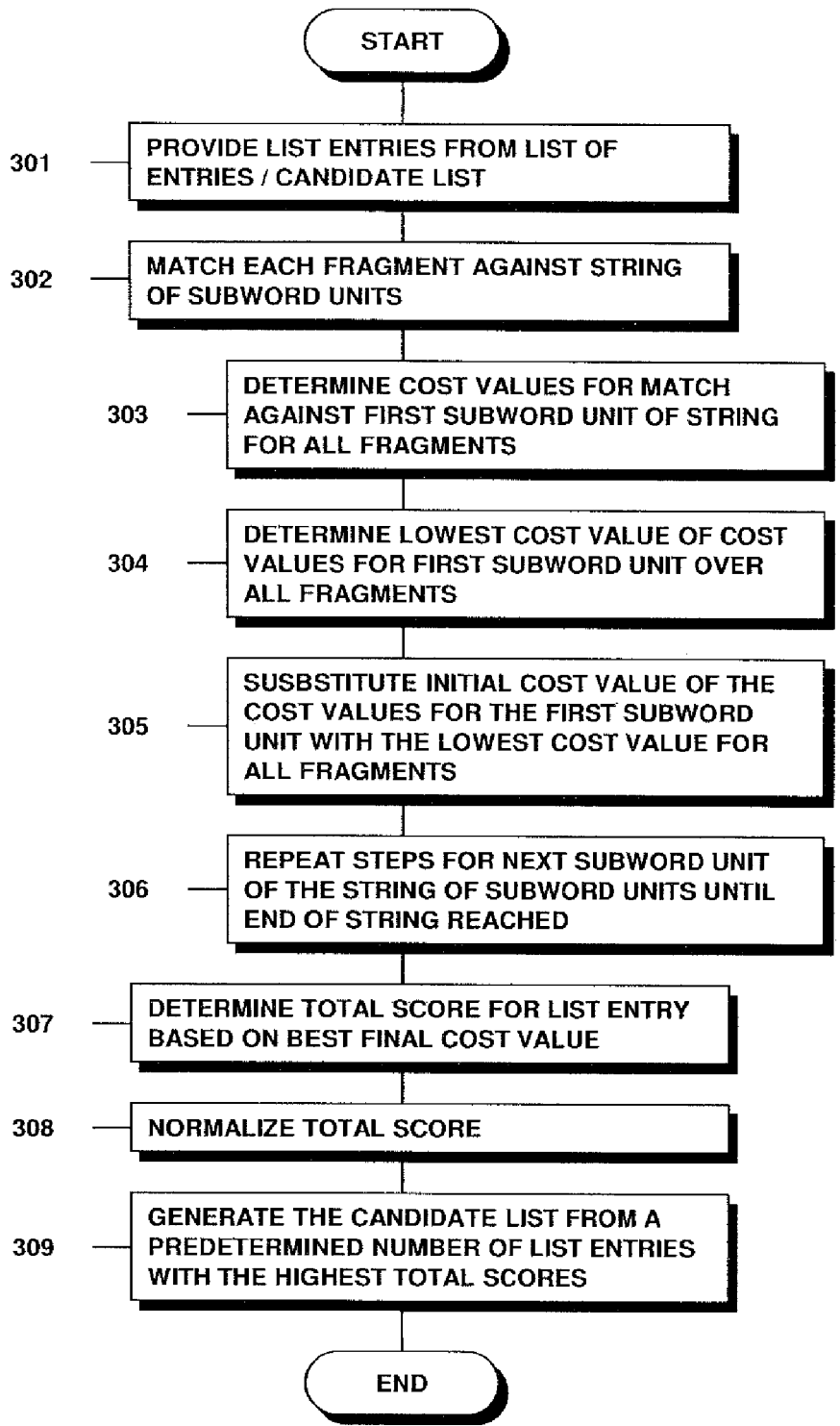
FIG. 3 is a schematic flow diagram of an embodiment of a method according to the first aspect of the invention, which may be performed at step 300 in FIG. 1.

FIG. 3 illustrates a method of an embodiment according to the first aspect of the invention which may be performed at step 300 of FIG. 1. A string of subword units corresponding to an utterance which the user may speak is approximated in the method of FIG. 3 by a loop recognition over the set of words in the list entry. For every list entry such a loop may be calculated. The scoring for a list entry is performed so that it considers any combination of fragments of the list entry. For example for the list entry "Autohaus Ulm Eichenweg" an utterance like "Ulm Eichenweg Ulm" may also be considered. This may result in a slightly worse recognition rate compared to a rolled-out approach where all possible speakable variants of fragments of a list entry are constructed and explicitly matched. Yet the open-loop fragment matching has the significant advantage that the problem is simplified in terms of computational complexity, as no alternatives in form of an n-best list or similar need to be tracked. The open-loop fragment matching may for example be realized using a weighted and possibly context-sensitive Levenshtein distance calculation.

Figure 8:
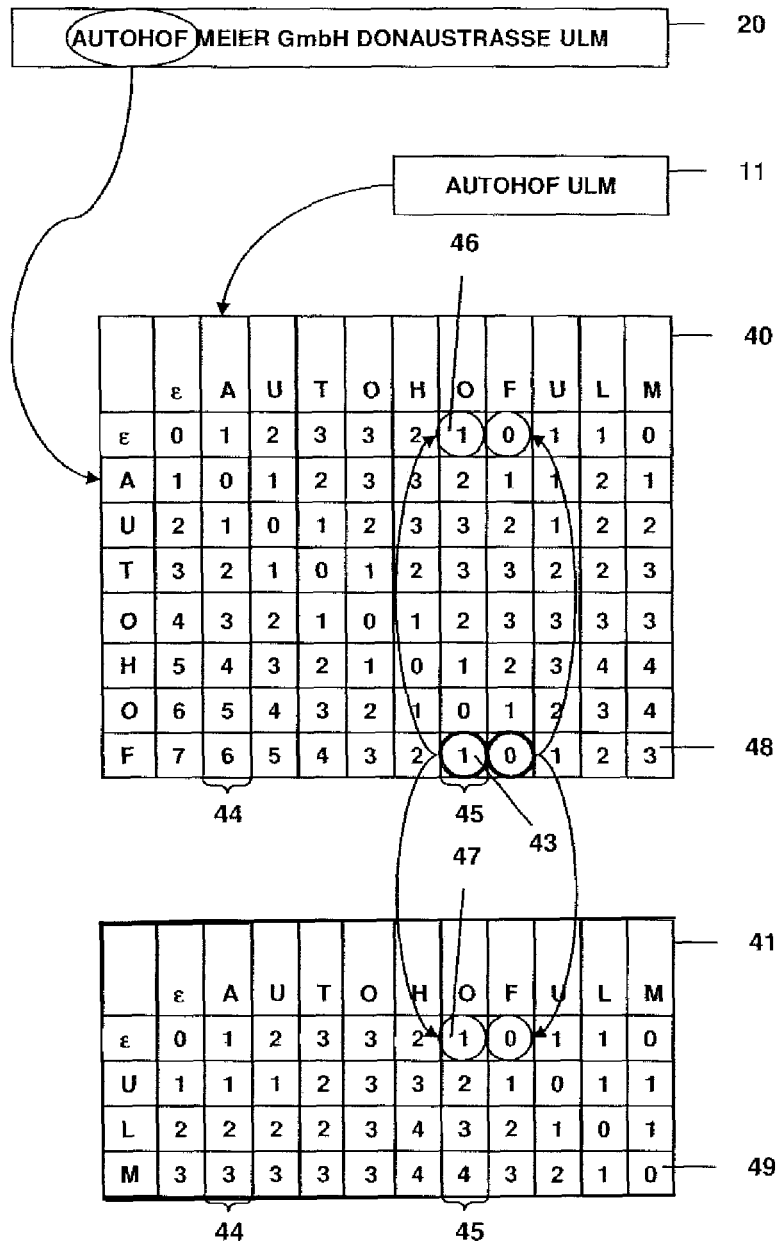
FIG. 8 is a schematic diagram illustrating the scoring of fragments of a list entry according to the method of FIG. 3 in more detail.

In a first step 301 the list of entries 12 or, if step 200 was performed, the candidate list 13 may be provided for performing the open-loop fragment matching. In a next step 302 each fragment of a list entry comprised in the provided list of entries is matched against the string of subword units. The matching of the fragments of a particular list entry is described in more detail with respect to steps 303-306 and FIG. 8. In FIG. 8 fragments of the list entry 20 are matched against the string of subword units 11 using a modified Levenshtein algorithm.

The Levenshtein algorithm illustrated in FIG. 8 uses the typical matrix scheme, with the string of subword units 11 from left to right and the fragment to be matched from top to bottom in a matrix for each fragment. Conventional Levenshtein algorithms using the calculation of cost values for substitutions, insertions and deletions are known to a person skilled in the art and will not be explained in greater detail here. In the modified Levenshtein algorithm of the present embodiment the cost values are calculated subword unit-wise, i.e. column-wise. In step 303 the cost values for the first subword unit of the string of subword units, i.e. column 44, is calculated for all fragments. The lowest cost value of all the cost values in the last row calculated for the first subword unit, i.e. in the last row of column 44, is then determined over all fragments. That means the cost values are calculated for the matching of each fragment of the list entry against the first subword unit, and the best or the lowest cost value of all the calculated cost values in the last row is determined. In the matrix of each fragment, an initial cost value of the column is then substituted by the determined lowest cost value. In the example of FIG. 8 the initial cost value to be substituted is positioned in the first row, as the calculation is performed from top to bottom. The substitution is only performed if the determined "lowest cost value" is lower than the initial cost value.

After substituting the initial cost value in step 305, the corresponding column may have to be recalculated. Typically, this needs to be done only in a few number of cases. In particular, only a part of the column may have to be recalculated until no further improvement of cost values caused by the substitution is achieved. The recalculation further requires less computational effort, as only deletions and the preceding value have to be considered. Steps 303-305 are then repeated for the next subword unit of the string of subword units in step 306. The steps are repeated until the end of the string of subword units is reached. The example of FIG. 8 illustrates the substitution of the initial cost value for matching of the sixth and the seventh subword unit of the string. After calculating the cost values for column 45, the lowest cost value of the last rows can be found in field 43. This cost value is then substituted into fields 46 and 47, as well as in the initial field of the matrices for the other fragments of the list entry 20 (not shown). This essentially corresponds to inserting the fragment having the lowest cost value before the other fragments. A final cost value for each fragment can then be found in the last row of the last column of the respective matrix, i.e. in field 48 for matrix 40 and in field 49 for matrix 41. As can be seen, the final cost value for matching the fragment "Ulm" equals 0, as in the columns preceding the corresponding segment of the string 11, the low cost values generated in the matching matrix 40 were inserted as initial values. The final cost value 49 thus corresponds to matching the combination "Autohof Ulm" against the string of subword units 11. Matching of the other fragments of list entry 20 (not shown) will yield higher final cost values.

As can be seen, the matching is performed so that any combination of fragments is allowed. As the matching requires only the calculation of one matrix per fragment, it can be performed efficiently and does not require high processing powers.

After the matrices of cost values are calculated for all fragments of the list entry, a total score is determined for the list entry based on the best final cost values in step 307. The final cost value for each fragment can be found in the bottom field of the rightmost column, i.e. field 48 of matrix 40 and field 49 of matrix 41. The lowest of the final cost values, i.e. field 49, is used to determine the total score for the list entry, which may be a probability like number indicating a probability of the string of subword units 11 matching the list entry 20. Again, the score may be adjusted in accordance with the language model, e.g. using a bigram model or the like. Further, the total score for a list entry may be normalized in step 308 as indicated above with reference to step 200, e.g. based on a language model. The language model may again try to ensure that the sum of the a priori probabilities belonging to the combinations of fragments of a list entry coincides with the previously set a priori probability of the list entry. For example, if the language model specifies that "all list entries are equally probable", then word transition penalties may be applied for list entries with more words versus list entries with fewer words. In this case the word transition penalty (or probability) may simply be determined as one divided by the number of fragments of the list entry. For this case the bigram weight of a word following itself may further be set to "not allowed". More complex schemes or language models may also be used.

In step 309 the candidate list is generated from a predetermined number of list entries having the highest total scores. The candidate list may thus simply comprise the best matching entries from the list of entries irrespective of the combinations of fragments on which the final scores are based. On the other hand, the combinations of fragments having the best matching scores may also be tracked, e.g. by providing a n-best list of the best matching combinations. For a particular list entry, a combination of fragments which achieves the best matching score, i.e. the lowest final cost value, may be backtracked from the cost value matrices, or may be tracked during the calculation of the matrices. It may, for example, be monitored which fragment achieves the lowest cost value for each column, which is then inserted into the matrices for the other fragments. In the example of FIG. 8 it can be determined that for the first seven subword units of the string of subword units, the fragment "Autohof" achieves the lowest cost values, whereas for the remaining subword units the fragment "Ulm" achieves the lowest cost values. The best matching combination "Autohof Ulm" can thus be backtracked.

The open-loop fragment matching may be further improved. As an example, a pruning can be applied during the calculating of the Levenshtein matrices. For fragments achieving only high cost values the later columns may not need to be calculated. For example, if a cost value exceeds a predetermined threshold value in a particular column, the calculation of the remaining columns may be omitted. Further, a weighted Levenshtein distance calculation may be used. The cost value for an edit operation may for example be weighted in dependence on the subword units that are being compared. That way, a similarity between subword units can be considered. For example, the cost value for a substitution of the letter "n" by the letter "m" may be relatively low, due to their similarity, whereas the cost value for a substitution with the letter "a" may be relatively high. The weighting may thus be configured so that similar subword units attract lower cost values, whereas dissimilar subword units attract higher cost values. Further, context-sensitive cost values may be used. The cost value may thus not only consider the subword units which are being compared, but also one or more preceding or successive subword units, both in the string of subword units, and the fragment to be matched. Here, context refers to the context of a subword unit within the fragment or the string of subword units, and the context-sensitive distance calculation may consider the probability of the occurrence of a subword unit in a particular context. As an example, the subword unit recognizer may not be capable of separating two successive subword units "s". An entry or fragment from the list of entries may comprise two successive "s", such as the fragment "usso". For a corresponding utterance, the subword unit recognizer would deliver the string "uso". The matching may now use a context sensitive weight, which would be relatively small for an operation of the type "deletion of subword unit s after subword unit s", whereas it would be larger for the operation "deletion of subword unit s after subword subword unit u". The first of the generations would thus attract a lower penalty. As a result, the first "s" in "usso" may be treated as a substitution against the "s" in "uso", whereas the second "s" in "usso" may be treated as a deletion during matching.

It should be clear that although FIG. 8 shows the calculation of Levenshtein matrices for letters, these may be calculated for any type of subword units, such as phonemes, syllables, and the like.

Figure 4:
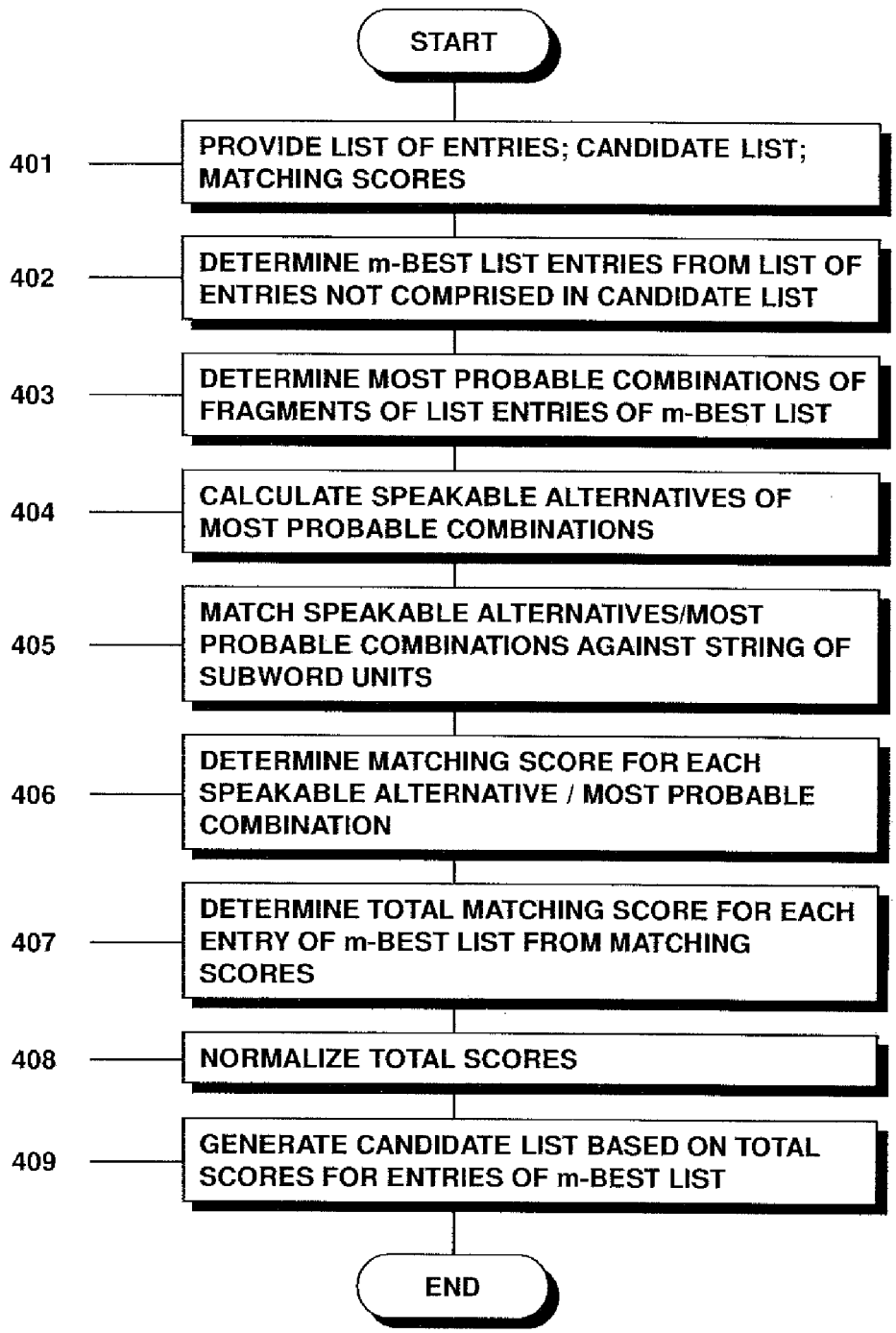
FIG. 4 is a schematic flow diagram of an embodiment of a method which may be performed at step 400 of FIG. 1.

FIG. 4 is a flow diagram of an embodiment of the rolled-out fragment matching step 400 of FIG. 1. It may for example be applied to list entries from the list of entries or a candidate list with only a few possible combinations of fragments, e.g. list entries with only few fragments with few phonetic alternatives per fragment and/or a restrictive bigram model. In this step, all speakable combinations of the fragments are calculated and explicitly matched against the string of subword units. In the embodiment of FIG. 4 step 400 is applied to the entries of a n-best list not comprised in the candidate list after step 200. In step 401 the list of entries, the candidate list 13 and the matching scores from step 200 are provided. m-best list entries from the list entries not comprised in the candidate list 13 are determined in step 402. In step 403 the most probable combinations of fragments of the list entries of the m-best list are determined. Fragments of a list entry having a matching score above a predetermined threshold may for example be used to form the explicit combinations. For short list entries, e.g. with fewer than four, three or two fragments, all possible combinations of the fragments may be determined.

In step 404 speakable alternatives of the most probable combinations are calculated. This may for example be performed by using a confusion matrix, yet it is optional. In step 405, the speakable alternatives for the most probable combinations are matched against the string of subword units. This explicit matching may be performed using a standard matching method, such as a Levenshtein algorithm. For each speakable alternative or most probable combination a matching score is determined in step 406. Based on these matching scores a total matching score is determined for each entry of the m best list in step 407. The total scores may further be normalized in step 408.

Again, a language model can be used in the determination of the matching scores for the combinations or the total scores for the list entries. The language model may in this case be calculated offline and corresponding scores may be added on top of the matching scores for the rolled-out combinations. As mentioned with respect to steps 200 and 300, the language model should ensure that list entries do not get advantaged due to e.g. comprising more words than other list entries, and it may consider a priori probabilities.

In a next step 409, the candidate list 15 is generated based on the total scores for the list entries of the m-best list. It is also possible to combine the results from the rolled-out matching step 400 with the results from the open-loop fragment matching step 300 by sorting the list entries together according to their total scores, whereby candidate list 14 may be generated.

It should be clear that the rolled-out fragment matching step 400 may also be applied after step 200 or after step 300, e.g. to short entries of the candidate list generated by the respective step. In other embodiments, list entries with only few fragments of the list 12 may directly be processed by step 400. Thus, parts of the processing may be performed off line. Step 400 may be further improved by making use of position-based scores which may be obtained e.g. in step 200. The position-based score may indicate the most probable spot of a fragment in the string of subword units, which may be obtained during a Levenshtein matching in step 200, or some other fragment spotting method. For example during a wildcard matching the most likely position of a fragment in the string of subword units may be determined. This position information may then be used for generating the explicit combinations of fragments for a list entry, which are then explicitly matched. Even for large list entries, comprising e.g. 10 fragments or more, the most probable combinations of fragments can effectively be generated by considering the position information. Step 400 can thus be performed without requiring extensive processing power or processing time. By performing step 400 parallel or additionally to steps 200 and 300, the quality of the generated candidate list can be further improved.

Figure 5:
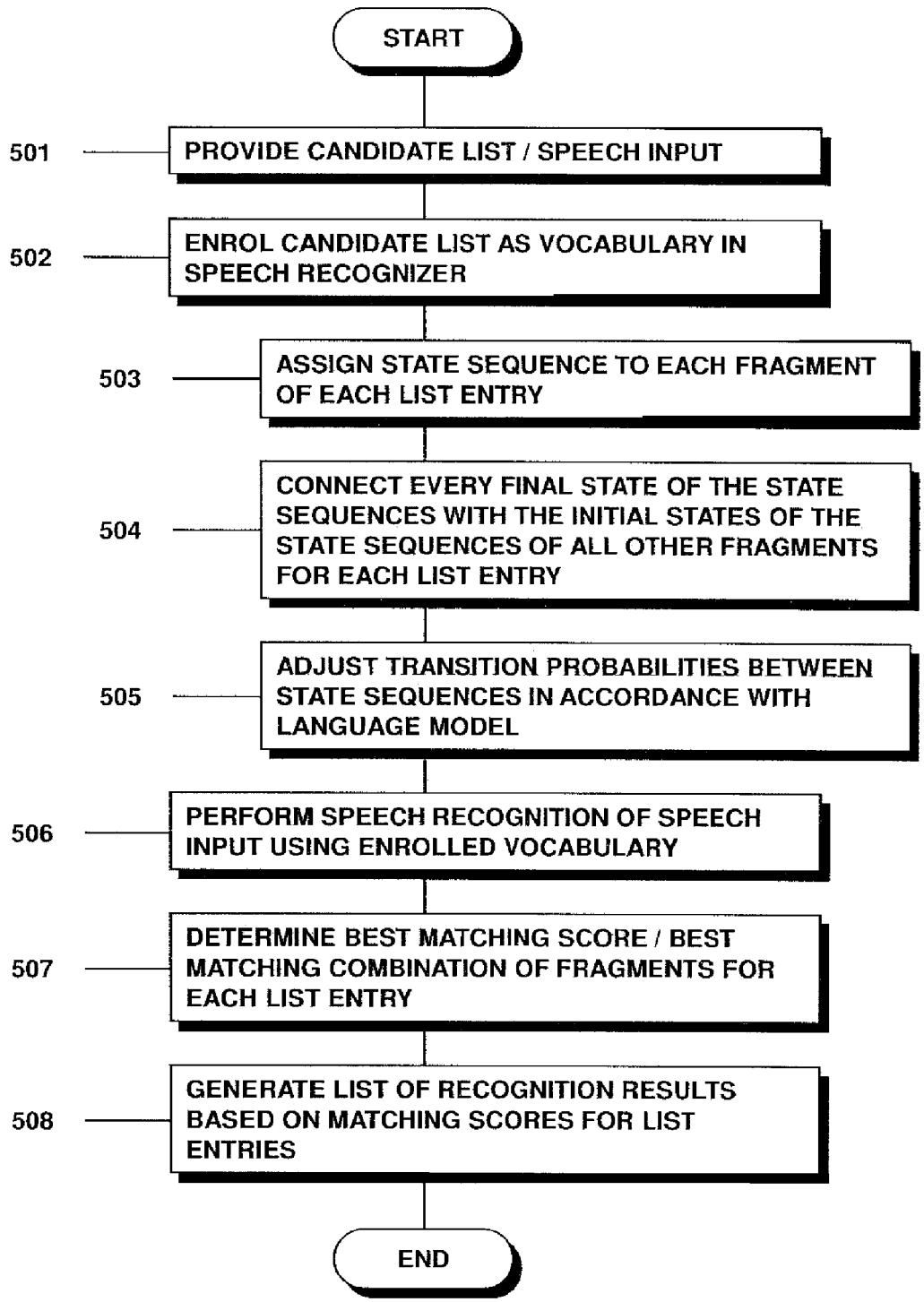
FIG. 5 is a schematic flow diagram of an embodiment of a method according to the third aspect of the invention, which may be performed at step 500 of FIG. 1.

FIG. 5 shows a flow diagram of an embodiment of a method according to the third aspect of the invention, which may be implemented at step 500 of FIG. 1. The method uses an open-loop fragment recognition. Conceptually, it is similar to step 300, as it allows the recognition of any combination of fragments of a list entry, yet it uses a speech recognizer instead of a matcher. There are several ways of achieving such an open-loop recognition. As an example, one state tree may be used for all fragments of all list entries. Yet this may lead to a slight loss of the recognition rate. In the present embodiment, the recognition is thus constricted to combinations of fragments within one list entry for each list entry.

In step 501 a candidate list, e.g. candidate list 14, and speech input 10 are provided to the speech recognizer. In step 502 the candidate list is enrolled as a vocabulary in the speech recognizer. During the enrolment, a strict distinction between list entries is made in the present embodiment, so that list entries have no overlapping states with the possible exception of a first and/or last state.

The enrolment of a list entry may be performed as indicated in steps 503-505. To every fragment of the list entry a separate state sequence is assigned (step 503). Every final state of the state sequences of the fragments are then connected with the initial states of the state sequences of all other fragments of the list entry (step 504). The transition probabilities between state sequences may be adjusted in accordance with a language model (step 505). The language model may again be configured as described with respect to the preceding steps 200, 300 and 400. A bigram model may for example be used, which defines the probabilities of an occurrence of a sequence of two fragments, or transition penalties for a transition from a fragment to itself may be applied. Predetermined a priori probabilities may also be considered.

Speech recognition of the speech input is performed in step 506 using the enrolled vocabulary. The speech recognition is generally performed on the original speech input 10, not on the string of subword units 11. The state sequences may for example be Hidden Markov Models (HMMs), and the speech recognition may be performed by finding the chain of HMMs having the highest probability of generating the speech input 10. For such a search, a Viterbi algorithm or any other algorithm capable of performing such a search may be used. As a result, a probability may be obtained for each list entry, which corresponds to the matching probability of the best matching combination of fragments of the list entry (step 507). It may also be tracked for each list entry which combination of fragments actually generated the highest probability score. Further, a tracking of the most probable combinations of fragments may be performed for each list entry. This may require one field per state and an extra updating at word transition, and may require additional time for processing. Further, a n-best list of the best matching combinations of fragments may also be generated for each list entry. Yet this requires additional processing time if n-best lists are generated for many list entries.

Generally, an explicit tracking of alternatives is not necessary in step 500. The recognizer does thus not need to remember the histories, although this can be done as mentioned above. The recognition can thus be performed faster with less processing power. As the recognition is performed open-loop, i.e. it is not restricted to a particular combination of fragments in a list entry; a partially spoken list entry can also be recognized with high precision.

Based on the total matching scores for each list entry or the corresponding probabilities, a list of recognition results is generated in step 508. The list may for example comprise a predetermined number of list entries with the highest probability or score, it may further comprise information on the combination of fragments on which the score for the list entry is based. As mentioned above, the inclusion of a n-best list of combinations for each list entry is also possible. The list may for example comprise one to ten entries. The list entries or the best matching combinations of fragments may later be provided to a user for selection. Further, the matching probabilities may also be comprised in the list of results and may later be provided to a user as a confidence value for the respective entry.

As the method does not require the generation of explicit sequences of fragments and thus of explicit chains of state sequences, the processing is simplified and the processing performance can be enhanced.

Figure 6:
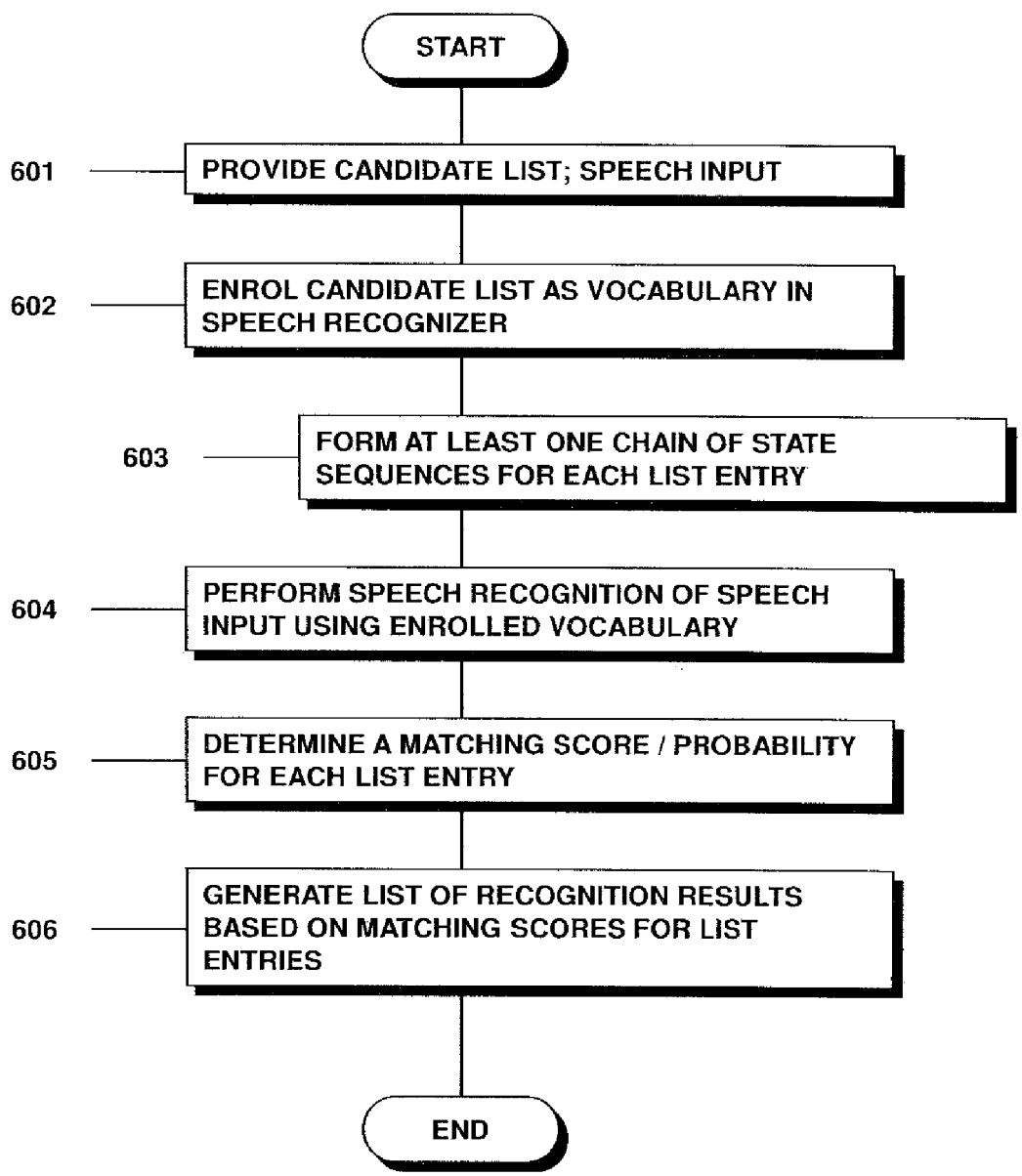
FIG. 6 is a schematic flow diagram of a method which may be performed at step 600 of FIG. 1.

An embodiment of the rolled-out recognition step 600, which may be performed on the results of step 500, or on the results of step 400, is schematically illustrated with the flow diagram of FIG. 6. It may for example be performed on short list entries having a limited number of fragments. It is again a recognition step which uses the candidate list or the list of recognition results as well as the original speech input 10 as an input (step 601). The candidate list or the list of recognition results may then be enrolled as a vocabulary in the speech recognizer by forming at least one chain of state sequences for each list entry (steps 602, 603). The recognition is limited to explicit combinations of fragments or their variants, the step being thus referred to as "rolled-out" recognition.

Using the enrolled vocabulary, a speech recognition of the speech input is performed in step 604. As explicit variants or combinations of fragments are used, the recognition is more precise, yet it is also more demanding in terms of processing power and processing time as the recognition step 500. For each list entry a score is determined based on the scores for the combinations or variants of the respective list entry (step 605), e.g. by taking the probability score of the best matching combination. In determining the probabilities and the scores for the list entries, a language model may again be considered, as mentioned above with respect to steps 200-500. Based on the matching scores for the list entries a list of recognition results is generated in step 606. The list may be generated as mentioned with respect to step 500.

If step 600 is performed parallel to step 500, then the list of recognition results 16 may be generated from the results of both steps, e.g. by sorting the list entries according to their probabilities or scores. The list may for example be limited to 1-10 best matching entries.

Figure 9:
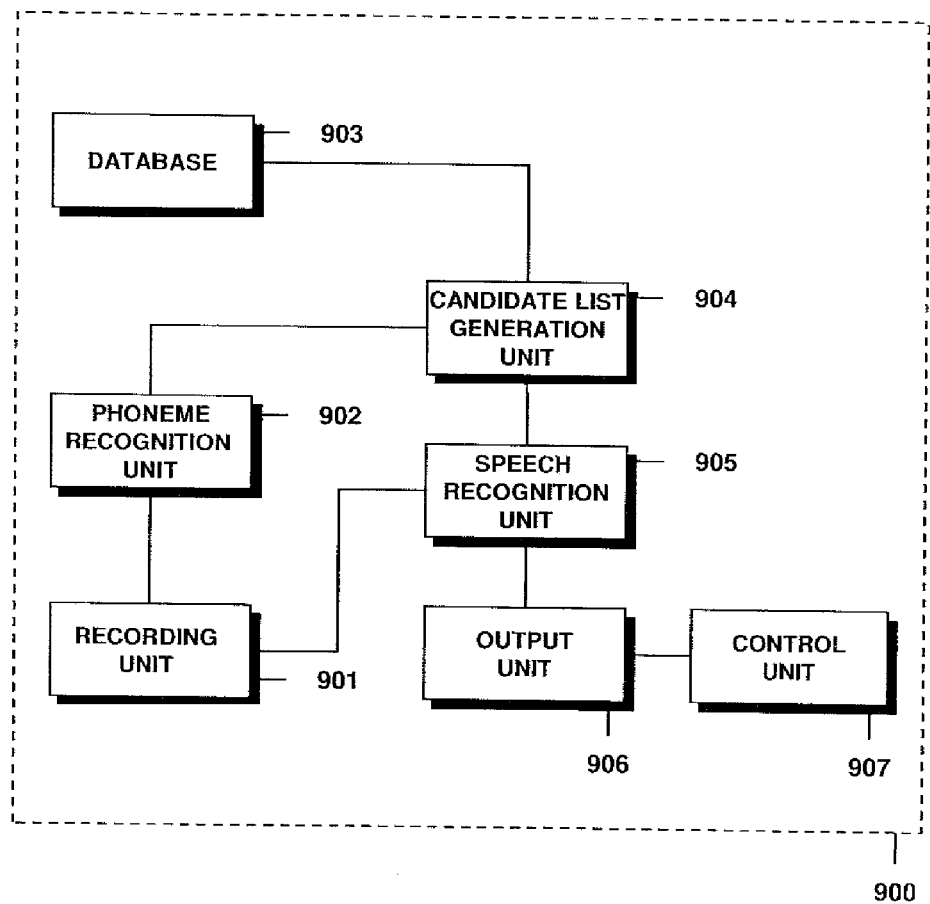
FIG. 9 is a schematic block diagram illustrating an embodiment of a speech recognition system according to the invention.

FIG. 9 is a schematic block diagram showing functional units of a speech recognition system 900 according to an embodiment of the present invention. Speech recognition system 900 comprises a recording unit 901 which is adapted to record a speech input. It may for example comprise a microphone, an analog-to-digital converter and the like. System 900 further comprises phoneme recognition unit 902, which processes the recorded speech input. Phoneme recognition unit 902 generates a string of subword units from the speech input using one of the above-described methods. The string of subword units is then provided to candidate list generation unit 904. Candidate list generation unit 904 further receives a list of entries from database 903. The database 903 with the list of entries may be stored in a memory of the speech recognition system 900, such as a flash memory, a random access memory, a hard drive, a CD ROM, and the like, or it may be stored remotely and may be accessible over a connection, such as a wired or wireless network connection or the like.

Candidate list generation unit 904 may operate according to one or a combination of steps 200, 300 and 400. It may for example generate a candidate list from the list of entries using step 200, and further shorten the candidate list by processing it in step 300. The generated candidate list is supplied to speech recognition unit 905, which further receives the original speech input 10 from recording unit 901. Speech recording unit 905 may implement one or a combination of the methods of steps 500 and 600. Speech recognition unit 905 delivers a list of recognition results to output unit 906, which may output the list to a user for selection. For the purpose of selection, an input unit may further be provided (not shown). In accordance with the selection of a list entry by the user a control unit 907 may perform a corresponding action. As an example, a user may select a point of interest from a list comprising a plurality of points of interest by the speech input, in accordance with which the control unit 907 initiates the calculation of a route to the selected point of interest. Further examples include the selection of phone number by speech input, the dialing of which may be initiated by control unit 907, or the giving of a command by speech input, the execution of which may be initiated by control unit 907.

Speech recognition system 900 may be implemented in any type of electronic device, such as a vehicle navigation system, a vehicle multimedia system, a personal navigation device, a communication device, such as a mobile phone, a personal digital assistant and the like. As the system does not require high processing powers, it is particularly well suited for an implementation in a portable device. The user may thus voice-control such a device, with recording unit 901 recording the user's voice as a speech input.

It should be clear that FIG. 9 is a functional representation of the speech recognition system 900 and that the different functional units may be integrated within the same electronic chip or circuit, or may be spread over multiple chips or circuits. As an example, units 902, 904, 905 and 907 may be implemented on a microprocessor of an electronic device comprising speech recognition system 900. Output unit 906 may be implemented as a display of such a device.

Those skilled in the art will appreciate that the features described above may be combined to form new embodiments. Further, various changes and modifications can be made without departing from the scope of the invention. The described embodiments are to be considered in all respects as illustrative and non-restrictive, and all changes coming within the meaning and equivalency range of the appended claims are intended to be embraced therein.

Although the previously discussed embodiments of the present invention have been described separately, it is to be understood that some or all of the above described features can also be combined in different ways. The discussed embodiments are not intended as limitations but serve as examples illustrating features and advantages of the invention. The embodiments of the invention described above are intended to be merely exemplary; numerous variations and modifications will be apparent to those skilled in the art. All such variations and modifications are intended to be within the scope of the present invention as defined in any appended claims.

It should be recognized by one of ordinary skill in the art that the foregoing methodology may be performed in a signal processing system (e.g. speech processing) and that the speech processing system may include one or more processors for processing computer code representative of the foregoing described methodology. The computer code may be embodied on a tangible computer readable storage medium i.e. a computer program product.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.).

What is claimed is:

1. A method of generating a candidate list from a list of entries in accordance with a string of subword units corresponding to a speech input in a speech recognition system, the list of entries including plural list entries each comprising at least one fragment having one or more subword units, the method comprising:
   for each list entry, comparing fragments of the list entry with the string of subword units;
   determining in the speech recognition system a matching score for each of the compared fragments based on the comparison, the matching score for a fragment being further based on a comparison of at least one other fragment of the same list entry with the string of subword units;
   determining a total score for each list entry on the basis of the matching scores for the compared fragments of the respective list entry; and
   generating the candidate list with the best matching entries from the list of entries based on the total scores of the list entries.

2. The method according to claim 1, wherein the matching score for a fragment of a list entry is determined such that the matching score corresponds to a matching score for matching a combination of the fragment with at least one other fragment of the same list entry against the string of subword units.

3. The method according to claim 2, wherein the determination of a total score for a list entry is based on the matching score corresponding to a matching score for a combination of fragments of the list entry, the determination being further configured so as to consider a language model comprising at least transition probabilities between the fragments of the combination.

4. The method according to claim 2, wherein the determining of the matching score for the fragment is performed so as to allow any combination of fragments of a list entry.

5. The method according claim 1, wherein the comparing is performed by matching each fragment of a list entry separately against the string of subword units.

6. The method according to claim 5, wherein the matching score for a fragment is determined by consecutively matching the fragment against each subword unit of the string of subword units.

7. The method according to claim 6, wherein comparing of a fragment of a list entry with the string of subword units comprises:
   determining cost values for the fragment by matching the fragment against a first subword unit of the string of subword units;
   of the cost values determined for the fragment for the first subword unit, substituting an initial cost value by the smallest of all cost values obtained in the last step of the matching of all fragments of the list entry separately against the first subword unit, wherein the substitution is only performed if the smallest cost value is smaller than the initial cost value; and repeating the determining of cost values and the substituting of an initial cost value of the determined cost values for the remaining subword units of the string of subword units, wherein the matching of the fragment against a subword unit considers at least one substituted initial cost value, whereby a final cost value for the compared fragment is obtained.

8. The method according to claim 1, further comprising:
determining a combination of the fragments of a list entry which best matches the string of subword units by analyzing intermediate scores determined by comparing the fragments of the list entry with a part of the string of subword units.

9. A method of generating a candidate list from a list of entries in accordance with a string of subword units corresponding to a speech input in a speech recognition system, the list of entries including plural list entries each comprising at least one fragment having one or more subword units, the method comprising:

comparing within the speech recognition system fragments of the list entries to the string of subword units within the speech recognition system;

determining a matching score for each fragment on the basis of the comparison, the matching score indicating how well the fragment matches the string of subword units;

determining a total score for each list entry based on the matching scores of the fragments of the respective list entry; and generating the candidate list with the best matching entries from the list of entries based on the total scores of the list entries wherein the comparing is performed for different context variants of a fragment, and wherein the matching score for a context variant of the fragment considers how well the context of the fragment corresponds to the context of a corresponding segment in the string of subword units.

10. The method according to claim 9, wherein the context variant of a fragment is accompanied by at least one wildcard, the wildcard representing the part of the string of subword units not considered in the fragment.

11. The method according to claim 9, wherein the matching score for the context variant is determined by matching the context variant including the wildcard against the string of subword units, the matching being configured such that the wildcard matches substantially uniformly against the subword units of the string.

12. The method according claim 9, wherein for each list entry, an intermediate score is determined for each of different combinations of fragments of the entry, the total score for the entry being determined from the intermediate scores.

13. The method according to claim 12, wherein the intermediate scores are calculated for combinations of fragments having a matching score above a predetermined threshold value.

14. The method according to claim 9, wherein for the determination of the intermediate score for a combination of fragments, the matching score of a context variant of the fragments is used which corresponds to the context of the fragments in the combination.

15. The method according to claim 12, wherein an intermediate score for a combination of fragments is penalized if the combination has at least one of the following properties:
the combination overcovers the string of subword units;
fragments of the combination cover the same part of the string of subword units; or
the combination does not cover all parts of the string of subword units.

16. The method according to claim 12, wherein for predetermined fragments of the list of entries, the comparing is performed using a speech recognizer, wherein for the remaining fragments of the list of entries, the comparing is performed using a matcher.

17. The method according to claim 9, further comprising:
providing the candidate list as second list of entries and generating a second candidate list from the second list of entries.

18. The method according to claim 9, wherein an a priori probability is assigned statically or dynamically to at least one of a fragment of a list entry, a combination of fragments of a list entry and a list entry, the a priori probability being taken into account when determining the total score for the list entry.

19. The method according to claim 18, wherein the a priori probabilities are determined on the basis of at least one of an information on a current position of a system implementing the method, a frequency of use of a list entry, a language model, a probability for a combination of fragments, and a probability for an ordering of fragments.

20. A method of selecting a list entry from a list of entries via speech input in a speech recognition system, the list of entries including plural list entries each comprising at least one fragment, the method comprising:
receiving a speech input;
generating a string of subword units from the speech input;
generating a candidate list comprising entries from the list of entries which are a preferred match for the string of subword units; and
performing speech recognition in the speech recognition system on the speech input using the candidate list as a vocabulary, wherein for an entry of the candidate list, a probability for the entry matching the speech input is obtained;

wherein the speech recognition step is configured so as to enable the recognition of any combination of fragments of a list entry for each list entry of the candidate list.

21. The method according to claim 20, wherein the fragments of the list entries of the candidate list are enrolled as a vocabulary in the speech recognizer, and
wherein the enrolment is performed so as to consider the grouping of the fragments in the list entries of the candidate list, and so as to enable the recognition of any combination of fragments within one list entry.

22. The method according to claim 20, wherein the speech recognition is based on Hidden Markov Models assigned to fragments or to subword units of fragments of the list entries of the candidate list.

23. The method according to claim 20, further comprising:
enrolling the candidate list as a vocabulary for performing the speech recognition by:
assigning a state sequence to each fragment of the candidate list; and
for each candidate list entry, connecting the final state of the state sequence of each fragment of the list entry to the initial states of the state sequences of the other fragments of the same list entry.

24. The method according to claim 23, wherein a language model is considered for determining transition probabilities between connected state sequences, the language model considering at least probabilities for an occurrence of predetermined sequences of fragments in a spoken input.

25. The method according to claim 20, further comprising:
generating a shortened candidate list from the list of entries or the candidate list by:
determining all possible permutations of predetermined fragments of a list entry for predetermined list entries of the list of entries or the candidate list;
matching each determined permutation of the predetermined fragments against the string of subword units to obtain a matching score for each permutation;
determining a total score for each predetermined list entry on the basis of the matching scores for the permutations determined for the list entry; and
generating the shortened candidate list of best matching entries from the predetermined list entries based on the total scores of the list entries,
wherein entries from the shortened candidate list are provided for being used in the vocabulary for the speech recognition.

26. The method according to claim 25, wherein the predetermined list entries for which the permutations are determined are the list entries from the list of entries or the candidate list having a number of fragments smaller than a predetermined threshold value.

27. The method according to claim 20, further comprising:
a second speech recognition step on the speech input, the second speech recognition step using a predetermined number of best matching entries from the result of first speech recognition step as a vocabulary.

28. A speech recognition system for selecting a list entry from a list of entries via speech input, the list of entries including plural list entries each comprising at least one fragment, the system comprising:
a database adapted to provide the list of entries;
a recording unit for recording a speech input;
a subword unit recognition unit adapted to generate a string of subword units from the speech input;
a candidate list generation unit adapted to generate a candidate list comprising entries from the list of entries which are a preferred match for the string of subword units; and
a speech recognition unit adapted to perform a speech recognition step on the speech input using the candidate list as a vocabulary, wherein for an entry of the candidate list, a probability for the entry matching the speech input is obtained;
wherein the speech recognition unit is further configured so as to enable the recognition of any combination of fragments of a list entry for each list entry of the candidate list.

29. A computer program product having a computer readable storage medium with computer code thereon for generating a candidate list from a list of entries in accordance with a string of subword units corresponding to a speech input, the list of entries including plural list entries each comprising at least one fragment having one or more subword units, the computer code comprising:
computer code for comparing fragments for each list entry with the string of subword units;
computer code for determining a matching score for each of the compared fragments based on the comparison, the matching score for a fragment being further based on a comparison of at least one other fragment of the same list entry with the string of subword units;
computer code for determining a total score for each list entry on the basis of the matching scores for the compared fragments of the respective list entry; and
computer code for generating the candidate list with the best matching entries from the list of entries based on the total scores of the list entries.

30. The computer program product according to claim 29, wherein the matching score for a fragment of a list entry is determined such that the matching score corresponds to a matching score for matching a combination of the fragment with at least one other fragment of the same list entry against the string of subword units.

31. The computer program product according to claim 30, wherein the determination of a total score for a list entry is based on the matching score corresponding to a matching score for a combination of fragments of the list entry, the determination being further configured so as to consider a language model comprising at least transition probabilities between the fragments of the combination.

32. The computer program product according to claim 30, wherein the computer code for determining of the matching score for the fragment is performed so as to allow any combination of fragments of a list entry.

33. The computer program product according claim 29, wherein the computer code for comparing is performed by matching each fragment of a list entry separately against the string of subword units.

34. The computer program product according to claim 33, wherein the matching score for a fragment is determined by computer code for consecutively matching the fragment against each subword unit of the string of subword units.

35. The computer program product according to claim 34, wherein the computer code for comparing of a fragment of a list entry with the string of subword units comprises:
computer code for determining cost values for the fragment by matching the fragment against a first subword unit of the string of subword units;
for the cost values determined for the fragment for the first subword unit, computer code for substituting an initial cost value by the smallest of all cost values obtained in the last step of the matching of all fragments of the list entry separately against the first subword unit, wherein the substitution is only performed if the smallest cost value is smaller than the initial cost value; and
computer code for repeating the determining of cost values and the substituting of an initial cost value of the determined cost values for the remaining subword units of the string of subword units,
wherein the computer code for matching of the fragment against a subword unit considers at least one substituted initial cost value, whereby a final cost value for the compared fragment is obtained.

36. The computer program product according to claim 29, further comprising:
computer code for determining a combination of the fragments of a list entry which best matches the string of subword units by analyzing intermediate scores determined by comparing the fragments of the list entry with a part of the string of subword units.

37. A computer program product having a computer readable storage medium with computer code thereon for generating a candidate list from a list of entries in accordance with a string of subword units corresponding to a speech input in a speech recognition system, the list of entries including plural list entries each comprising at least one fragment having one or more subword units, the computer code comprising:

computer code for comparing fragments of the list entries to the string of subword units;

computer code for determining a matching score for each fragment on the basis of the comparison, the matching score indicating how well the fragment matches the string of subword units;

computer code for determining a total score for each list entry based on the matching scores of the fragments of the respective list entry; and computer code for generating the candidate list with the best matching entries from the list of entries based on the total scores of the list entries wherein the computer code for comparing is performed for different context variants of a fragment, and wherein the matching score for a context variant of the fragment considers how well the context of the fragment corresponds to the context of a corresponding segment in the string of subword units.

38. The computer program product according to claim 37, wherein the context variant of a fragment is accompanied by at least one wildcard, the wildcard representing the part of the string of subword units not considered in the fragment.

39. The computer program product according to claim 37, wherein the matching score for the context variant is determined by matching the context variant including the wildcard against the string of subword units, the matching being configured such that the wildcard matches substantially uniformly against the subword units of the string.

40. The method according claim 37, wherein for each list entry, an intermediate score is determined for each of different combinations of fragments of the entry, the total score for the entry being determined from the intermediate scores.

41. The computer program product according to claim 40, wherein the intermediate scores are calculated for combinations of fragments having a matching score above a predetermined threshold value.

42. The computer program product according to claim 37, wherein the computer code for the determination of the intermediate score for a combination of fragments, the matching score of a context variant of the fragments is used which corresponds to the context of the fragments in the combination.

43. The computer program product according to claim 40, wherein an intermediate score for a combination of fragments is penalized if the combination has at least one of the following properties:

the combination overcovers the string of subword units;
fragments of the combination cover the same part of the string of subword units; or
the combination does not cover all parts of the string of subword units.

44. The computer program product according to claim 40, wherein for predetermined fragments of the list of entries, the computer code for comparing is performed using a speech recognizer module, wherein for the remaining fragments of the list of entries, the comparing is performed using a matcher module.

45. The computer program product according to claim 37, further comprising:

computer code for providing the candidate list as second list of entries and generating a second candidate list from the second list of entries.

46. The computer program product according to claim 37, wherein an a priori probability is assigned statically or dynamically to at least one of a fragment of a list entry, a combination of fragments of a list entry and a list entry, the a priori probability being taken into account when determining the total score for the list entry.

47. The computer program product according to claim 46, wherein the a priori probabilities are determined on the basis of at least one of an information on a current position of a system implementing the method, a frequency of use of a list entry, a language model, a probability for a combination of fragments, and a probability for an ordering of fragments.

48. A computer program product including a computer readable storage medium having computer code thereon for selecting a list entry from a list of entries via speech input, the list of entries including plural list entries each comprising at least one fragment, the computer code comprising:

computer code for receiving a speech input;
computer code for generating a string of subword units from the speech input;
computer code for generating a candidate list comprising entries from the list of entries which are a preferred match for the string of subword units; and
computer code for performing a speech recognition step on the speech input using the candidate list as a vocabulary, wherein for an entry of the candidate list, a probability for the entry matching the speech input is obtained;
wherein the speech recognition step is configured so as to enable the recognition of any combination of fragments of a list entry for each list entry of the candidate list.

49. The computer program product according to claim 48, wherein the fragments of the list entries of the candidate list are enrolled as a vocabulary in the speech recognizer, and wherein the enrolment is performed so as to consider the grouping of the fragments in the list entries of the candidate list, and so as to enable the recognition of any combination of fragments within one list entry.

50. The computer program product according to claim 48, wherein the speech recognition is based on Hidden Markov Models assigned to fragments or to subword units of fragments of the list entries of the candidate list.

51. The computer program product according to claim 48, further comprising:

computer code for enrolling the candidate list as a vocabulary for performing the speech recognition by:
assigning a state sequence to each fragment of the candidate list; and
for each candidate list entry, connecting the final state of the state sequence of each fragment of the list entry to the initial states of the state sequences of the other fragments of the same list entry.

52. The computer program product according to claim 51, wherein a language model is considered for determining transition probabilities between connected state sequences, the language model considering at least probabilities for an occurrence of predetermined sequences of fragments in a spoken input.

53. The computer program product according to claim 48, further comprising:

computer code for generating a shortened candidate list from the list of entries or the candidate list by determining all possible permutations of predetermined fragments of a list entry for predetermined list entries of the list of entries or the candidate list;
computer code for matching each determined permutation of the predetermined fragments against the string of subword units to obtain a matching score for each permutation;
computer code for determining a total score for each predetermined list entry on the basis of the matching scores for the permutations determined for the list entry; and computer code for generating the shortened candidate list of best matching entries from the predetermined list entries based on the total scores of the list entries, wherein entries from the shortened candidate list are provided for being used in the vocabulary for the speech recognition.

54. The computer program product according to claim 53, wherein the predetermined list entries for which the permutations are determined are the list entries from the list of entries or the candidate list having a number of fragments smaller than a predetermined threshold value.

55. The computer program product according to claim 48, further comprising:

computer code for a second speech recognition step on the speech input, the second speech recognition step using a predetermined number of best matching entries from the result of first speech recognition step as a vocabulary.

* * * * *